United States Patent [19]
DelSanto

[11] Patent Number: 5,829,574
[45] Date of Patent: Nov. 3, 1998

[54] MACHINE FOR GROUPING INDIVIDUALLY-CONVEYED PRODUCTS, PARTICULARLY FOOD PRODUCTS, CONFECTIONERY PRODUCTS AND THE LIKE, FOR PACKAGING

[75] Inventor: Mario DelSanto, Feletto, Italy

[73] Assignee: Hitech Systems S.r.l., Leini', Italy

[21] Appl. No.: 542,465

[22] Filed: Oct. 12, 1995

[30] Foreign Application Priority Data

Oct. 27, 1994 [IT] Italy ............................ TO94 A 000860

[51] Int. Cl.$^6$ ................................................. B65G 47/26
[52] U.S. Cl. ........................ 198/460.2; 198/444; 198/457
[58] Field of Search .................................. 198/430, 812, 198/594, 347.1, 347.3, 731, 803.01, 444, 794, 460.2, 457

[56] References Cited

U.S. PATENT DOCUMENTS

| | | | |
|---|---|---|---|
| 2,627,338 | 2/1953 | Vodoz | 198/731 X |
| 2,932,376 | 4/1960 | Millington | 198/812 |
| 3,655,026 | 4/1972 | Hirn . | |
| 3,776,344 | 12/1973 | Harrison . | |
| 3,794,154 | 2/1974 | Holt . | |
| 5,314,054 | 5/1994 | van Laar | 198/347.1 |

FOREIGN PATENT DOCUMENTS

| | | |
|---|---|---|
| 0509583 | 10/1992 | European Pat. Off. . |
| 2257439 | 5/1974 | Germany . |

*Primary Examiner*—Donald W. Underwood
*Attorney, Agent, or Firm*—Guido Modiano; Albert Josif

[57] ABSTRACT

The machine comprises a conveyor provided with compartments for accommodating individual products and closed in a loop to receive on one portion the products arriving from a conveyor and to transfer them onto the other portion to a pick-up means. A speed reduction unit is arranged at the first portion of the compartmented conveyor and moves at the same speed as the conveyor in order to receive the incoming products and transfer them, while slowing them, into a respective compartment of the conveyor. The conveyor is constituted by a toothed belt that detachably supports the compartments. The machine also comprises electronic means for optimizing the movement of the conveyor by correlating it with the incoming rate of the products.

12 Claims, 4 Drawing Sheets

MACHINE FOR GROUPING INDIVIDUALLY-CONVEYED PRODUCTS, PARTICULARLY FOOD PRODUCTS, CONFECTIONERY PRODUCTS AND THE LIKE, FOR PACKAGING

BACKGROUND OF THE INVENTION

The present invention relates to a machine for grouping, for subsequent packaging, products that are conveyed individually and continuously for example by a belt conveyor, particularly food products, confectionery products, and the like, arriving from another machine that has already individually wrapped them in a corresponding individual protective package.

The machine according to the invention, interposed between the belt for conveying products individually and a station for packaging a plurality thereof, for example in boxes, has the purpose of receiving at one end the products conveyed by the belt, of temporarily storing a group of said products, and of transferring each group to the other end of the machine, where said groups are removed for packaging.

Machines of this type are already known and widely used in various industrial sectors; in particular, a machine for the specified use is disclosed in German patent no. 3724839. Said machine comprises, according to a known arrangement, a continuous chain conveyor closed in a loop between two pinions arranged at the two ends of a supporting slider, which is mounted slidingly so as to advance or retract in a longitudinal direction. The chain conveyor is provided with a plurality of compartments for accommodating individual products, and each one of the oppositely arranged portions of the conveyor is controlled by a respective movement motor that moves the corresponding conveyor portion under the control of sensor means.

During loading, the first portion, which is directed towards the individual-product conveyor, moves stepwise so as to accommodate each incoming product into a corresponding compartment. During this step, the second portion of the conveyor, which is directed towards the group removal station, is at standstill, so that the movement of the first portion causes a corresponding advancement of the supporting slider. When a preset number of compartments of the conveyor is loaded with corresponding individual products, the second portion is actuated in reverse with respect to the direction of the first portion, which is kept at standstill, and the group of loaded products is transferred simultaneously into the removal position.

During its movement, the second conveyor portion causes the retraction of the supporting slider into the initial position in order to start a new grouping and transfer cycle.

Known machines of the specified type have numerous structural and functional drawbacks, and mainly:
considerable complexity, with consequent high manufacturing costs, low reliability in operation, and difficult cleaning and maintenance operations;
presence of mutually moving parts that require abundant lubrication, consequently exposing the processed products to dirtying and requiring frequent interventions for cleaning the machine;
possibility of damaging the processed products, especially in the case of confectionery products, due to the impact suffered by said products, during insertion, against the bottom of the compartments; the higher the conveying speed of the individual products and the higher the travel speed of the compartments, the greater the impact;
inability to adjust the time interval between the advancement steps of the compartments according to the rate at which the individually conveyed products arrive;
high noise level in operation, with consequent acoustic pollution of the work areas.

SUMMARY OF THE INVENTION

The present invention aims substantially at eliminating these and other drawbacks of known machines, and within the scope of this general aim it has the following important particular objects:
to provide a machine that is structurally simplified, particularly in order to make maintenance, cleaning and repair operations easier, and wherein the work area is in any case entirely lubricant-free so as to maintain the full integrity of the processed products;
to provide a machine having means for avoiding any damage to the processed products during the step for the insertion of said products in the compartments and for furthermore optimizing the acceleration and deceleration of the compartments, on the loading side of the conveyor belt, by correlating them to the rate at which the products arrive.

According to the present invention, this aim, these important objects, and others are achieved with an improved grouping machine having the specific features stated in the appended claims.

Substantially, according to the invention, in order to prevent damage of the products during loading, the machine comprises a speed reduction unit located at the first portion of the compartmented conveyor which is directed towards the individual-product conveyor and having compartments for receiving each product. Said speed reduction unit moves at the same speed as the conveyor and follows it over an extent of convenient length in order to receive the incoming products and transfer them, while slowing them, into the respective compartment while the conveyor moves in the loading direction.

The substantially fork-shaped compartments of the conveyor slide, by virtue of the motion imparted to said conveyor by two driving sprockets rigidly coupled to the supporting slider, on respective oppositely arranged loading and removal surfaces that are provided below the compartments of the first and second portions of said conveyor. Two oppositely arranged motors are provided in order to selectively move said first and second portions of said conveyor by means of a toothed driving belt lying below the conveyor and guided by corresponding sprockets that are coaxial and rigidly coupled to the respective driving sprockets of the conveyor. The oppositely arranged motors are provided with respective toothed rollers engaging respectively the first portion of the driving belt, so as to cause the stepwise motion of the corresponding first portion of the conveyor to load groups of products, and the second portion of the driving belt, in order to move, by extents equal to multiple steps, the corresponding second portion of the conveyor and transfer each group of products from the loading side to the individual group removal side.

Another feature, particularly advantageous as to the machine cleaning and maintenance operations, is that the compartmented conveyor is constituted by a toothed belt having, on its outer side, a plurality of tabs that are uniformly and appropriately spaced, have for example a T-shaped cross-section, and are adapted to detachably engage and retain the corresponding plurality of compartments.

Another important feature of the machine, aimed at optimizing the movement of the compartments and consequently reducing vibrations, is that said machine is provided with electronic means for detecting the feeding rate of the individual products, by means of a corresponding measurement of the distance between two successive products, and for correlating said rate with the acceleration imparted to the compartments during the execution of the advancement steps.

BRIEF DESCRIPTION OF THE DRAWINGS

The features, purposes, and advantages of the machine according to the present invention will become apparent from the following detailed description and with reference to the accompanying drawings, given by way of non-limitative example, wherein.

DESCRIPTION OF THE PREFERRED EMBODIMENTS

Figure 1:
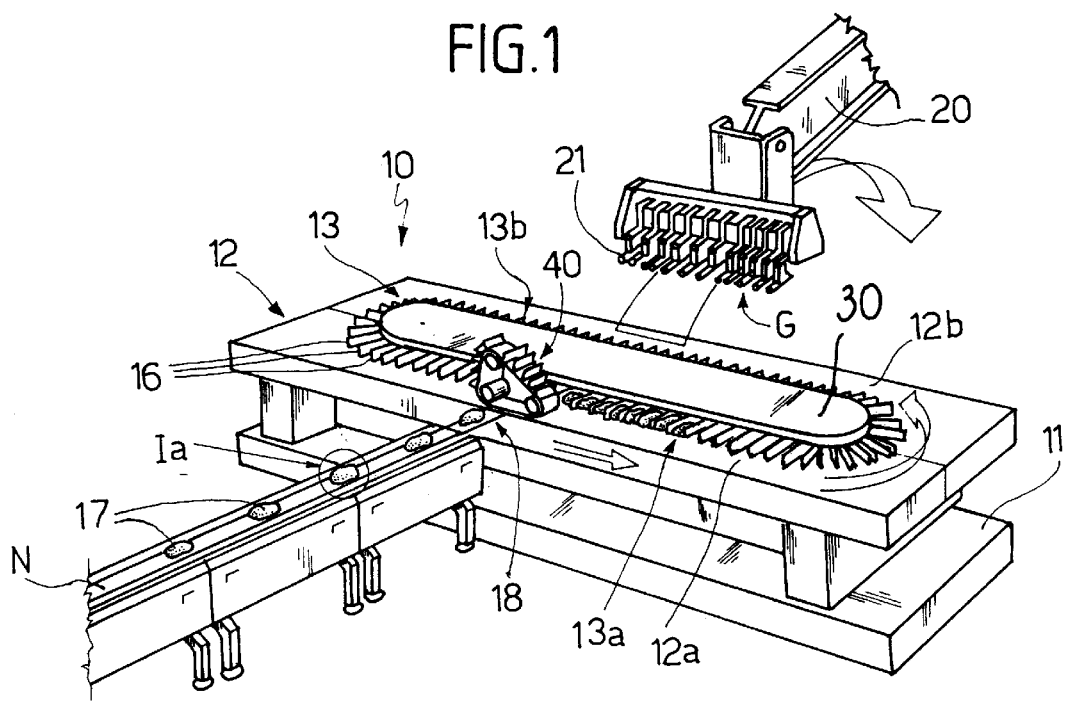
FIG. 1 is a perspective view of the entire machine.
Figure 1A:
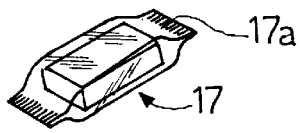
FIG. 1a is an enlarged-scale view of a detail of FIG. 1.
Figure 1B:
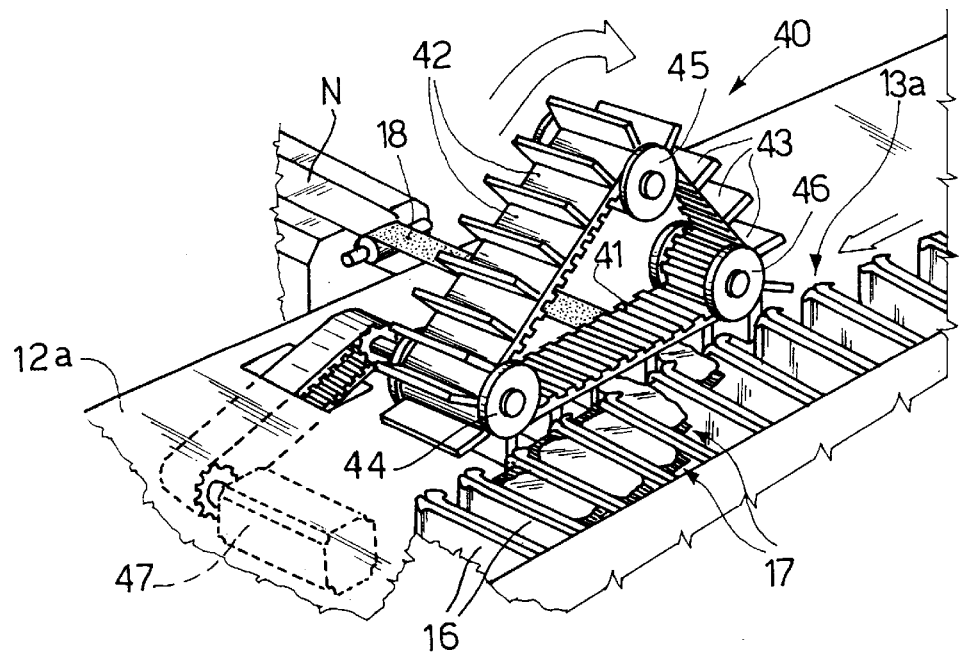
FIG. 1b is an enlarged-scale perspective view of a detail of the speed reduction unit.

In the drawings, the reference numeral 10 generally designates the entire machine, which comprises a table-like structure 11 with a working surface 12 whereon a compartmented conveyor 13 is arranged. The conveyor 13 is closed in a loop, is guided by two driving sprockets 14–15 (FIG. 2), and has a plurality of compartments 16 for accommodating individual products 17 arriving, by means of a conveyor belt N, from a machine that has already individually wrapped them in a corresponding individual protective package 17a. The conveyor 13 comprises a first portion 13a and a second portion 13b that are respectively directed towards a conveyor 18 for the individual products 17 and towards a means for removing groups G of products, constituted for example by a robotized arm 20 provided with a comb formed by pick-up clamps 21. Correspondingly, respective oppositely arranged loading and pick-up surfaces 12a and 12b are provided on the working surface 12, and the compartments 16 slide thereon. Each compartment 16 is constituted by a substantially fork-shaped structure made of polymeric material and comprising a base 16a whereon a corresponding recessed seat 16b is formed so as to detachably retain the compartment on the conveyor 13. Said conveyor is formed by a toothed belt 22 made of reinforced polymeric material, closed in a loop around the driving sprockets 14 and 15, and tensioned by said sprockets, said belt being furthermore provided, on its outer side, with a plurality of tabs 23 that are uniformly and appropriately spaced for the detachable engagement and retention of the corresponding plurality of compartments 16. The tabs 23 preferably have a T-shaped cross-section, so as to slidingly engage the seats 16b of the tabs, which are correspondingly T-shaped.

Figure 2:
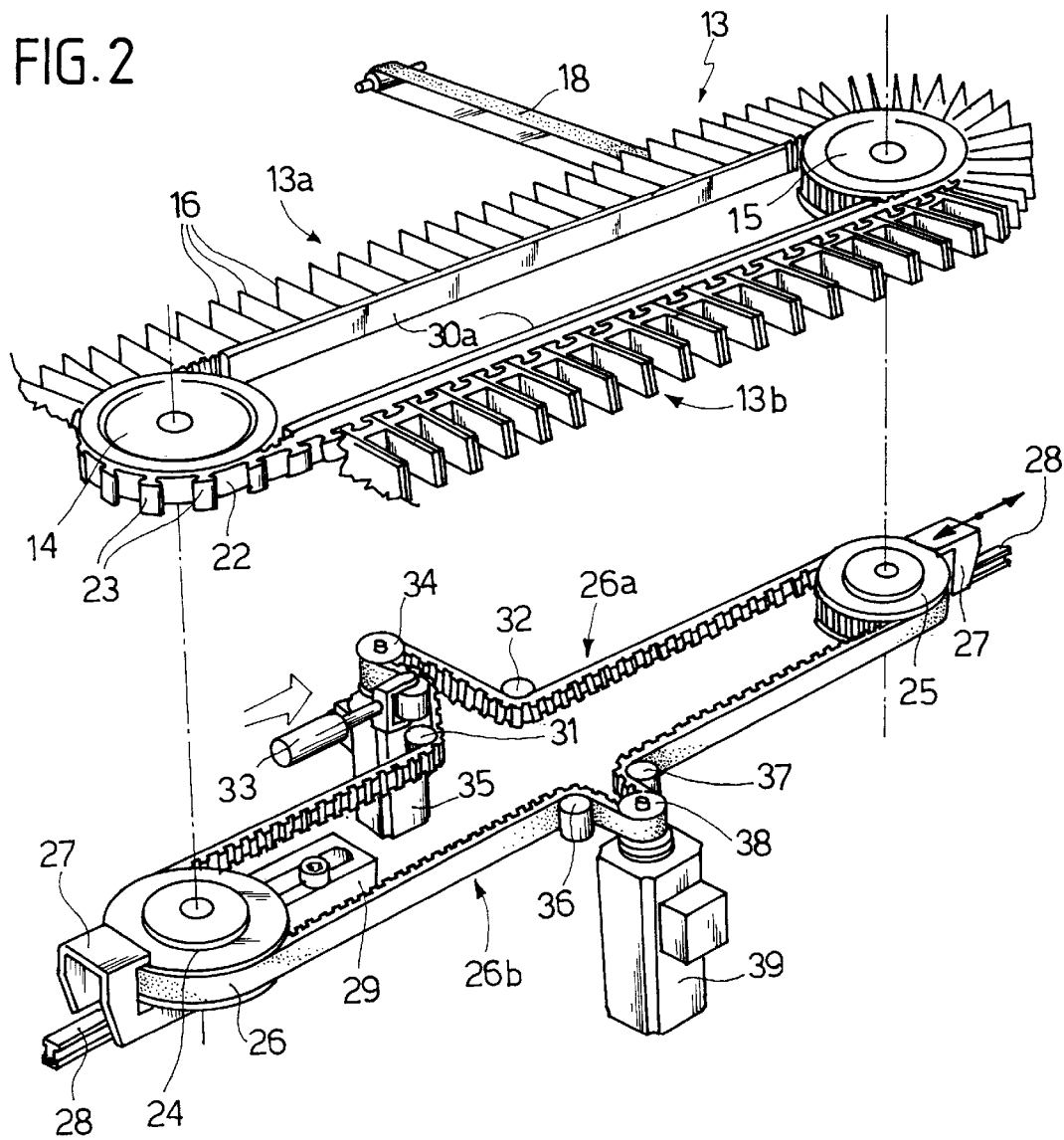
FIG. 2 is an exploded perspective view of the compartmented conveyor and of the corresponding movement means.
Figure 3:
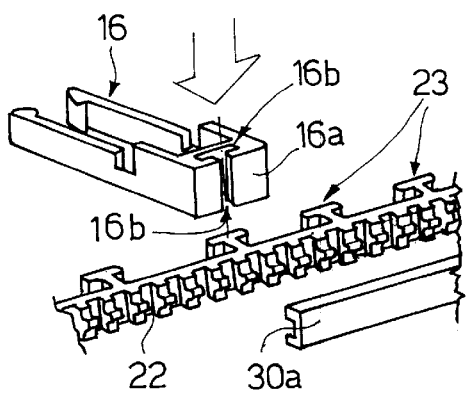
FIG. 3 is an enlarged-scale exploded perspective view of a detail of the conveyor belt and of the method for the detachable coupling of the compartments of said belt.
Figure 4:
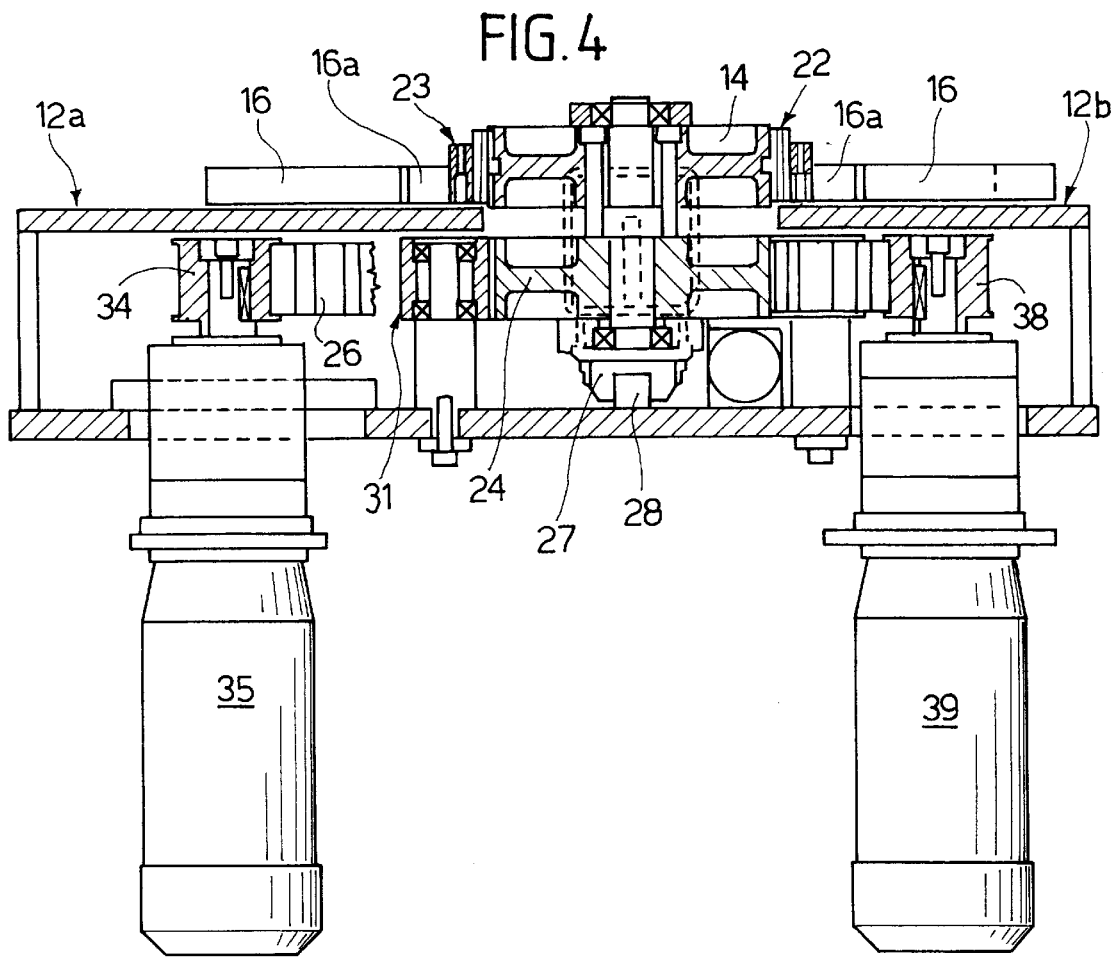
FIG. 4 is a transverse sectional view of the machine, taken along a plurality of planes, at one of the driving sprockets and through the traction elements of the conveyor.

As clearly shown in FIG. 2, the driving sprockets 14 and 15 are coaxial and rigidly coupled to a second pair of sprockets 24 and 25 for guiding a driving toothed belt 26 also made of reinforced polymeric material. The oppositely arranged pairs 14–24 and 15–25 of guiding and driving sprockets are freely rotatably supported by a supporting slider 27, which is slidingly mounted on a corresponding guide 28 so as to advance or retract in a longitudinal direction. The two sprockets 14 and 24 are also controlled by a tensioning element 29, which loosens the belt 22 (FIG. 1) of the conveyor 13 for easy removal. A detachable lid 30 is provided to protect and conceal the driving and guiding sprockets and the corresponding belt 22 of the conveyor and driving belt 26, and two rods 30a are provided to protect and retain the portions of the belt 22.

The portion 26a of the driving belt, which is directed towards the loading side of the individual products 17, is engaged at its median region, with the interposition of guides 31–32 and of a spring tensioner 33, by the toothed roller 34 of a motor 35 for moving the portion 13a of the conveyor 13. Likewise, the portion 26b of the driving belt 26 is also engaged at its median region and with the interposition of guides 36–37 by the toothed roller 38 of an oppositely arranged motor 39 for moving the portion 13b of the conveyor 13. The motors 35–39 are of the known brushless type and are respectively provided in order to cause the stepwise motion of the respective portion 13a of the conveyor 13 in steps that are equal to the spacing pitch of the compartments 16, and to move the second portion 13b of the conveyor by extents equal to multiple steps corresponding to the number of products of each group G. The movement of the two conveyor portions is selective, in that when the first portion is moving, the second one is at standstill, and vice versa.

Likewise, the movement of the first portion of the conveyor causes the advancement of the retention slider 27, and the movement of the second portion of the conveyor causes the retraction of said slider. Each advancement of the portion 13a of the conveyor by one step causes the compartments 16 to align in succession with the conveyor 18 in order to receive the products 17. In order to reduce the speed at which the product 17 is inserted into each individual compartment 16 and accordingly avoid the impact of said product on the bottom of the compartment, there is provided, according to the invention, a speed reduction unit 40 arranged adjacent to the conveyor 13 and directed towards the conveyor 18.

The speed reduction unit 40 is substantially constituted by a toothed elastomeric track 41 provided with product receiving spaces 42, which are delimited by partitions 43 and are mutually spaced by a pitch that is equal to the spacing pitch of the compartments 16. The track 41 is stretched between three toothed guiding sprockets 44–45–46, one of which is a driving sprocket and is actuated by a motor 47, also of the brushless type, which rotates in perfect synchronization with the motor 35 by virtue of an electric shaft coupling provided between the two motors. This means that the second motor is synchronized with the first motor by means of a feedback to the second motor: this is an electric feedback means 50. The lower portion 41 of the track, which lies between the guiding sprockets 44–45, runs parallel and adjacent to the conveyor 13 over an extent of convenient length, for example equal to five consecutive compartments 16, and follows the conveyor 13 in its movement in order to receive a corresponding incoming product 17 in each one of its spaces 42 and transfer it, while slowing it, into the facing compartment 16, while the portion 13a of the conveyor 13 moves in the advancement direction.

An optical sensor (not shown) is provided on the input side of the speed reduction unit 40 in order to synchronously activate the motors 35–47 when each product 17 approaches. The spaces 42 of the track 41 substantially act as elements for providing an ideal extension of each compartment 16, and by moving the products 17 laterally outside the conveyor 18 they slow them down by sliding on the loading surface 12a, reducing the speed of the products when entering the respective compartment 16. An optional guide (not shown), arranged on the loading surface 12a, can be provided in order to move the products 17 onto the rear end of each compartment when the speed reduction unit 40 has disengaged the conveyor 13.

The described machine is furthermore provided with electronic means for detecting the rate of the individual products 17 fed by the belt N by means of a corresponding measurement of the distance D between two successive products and of the speed of the conveyor belt N, in order to optimize acceleration and deceleration of the compartments 16 in performing each step p, correlating them to said rate.

Figure 5:
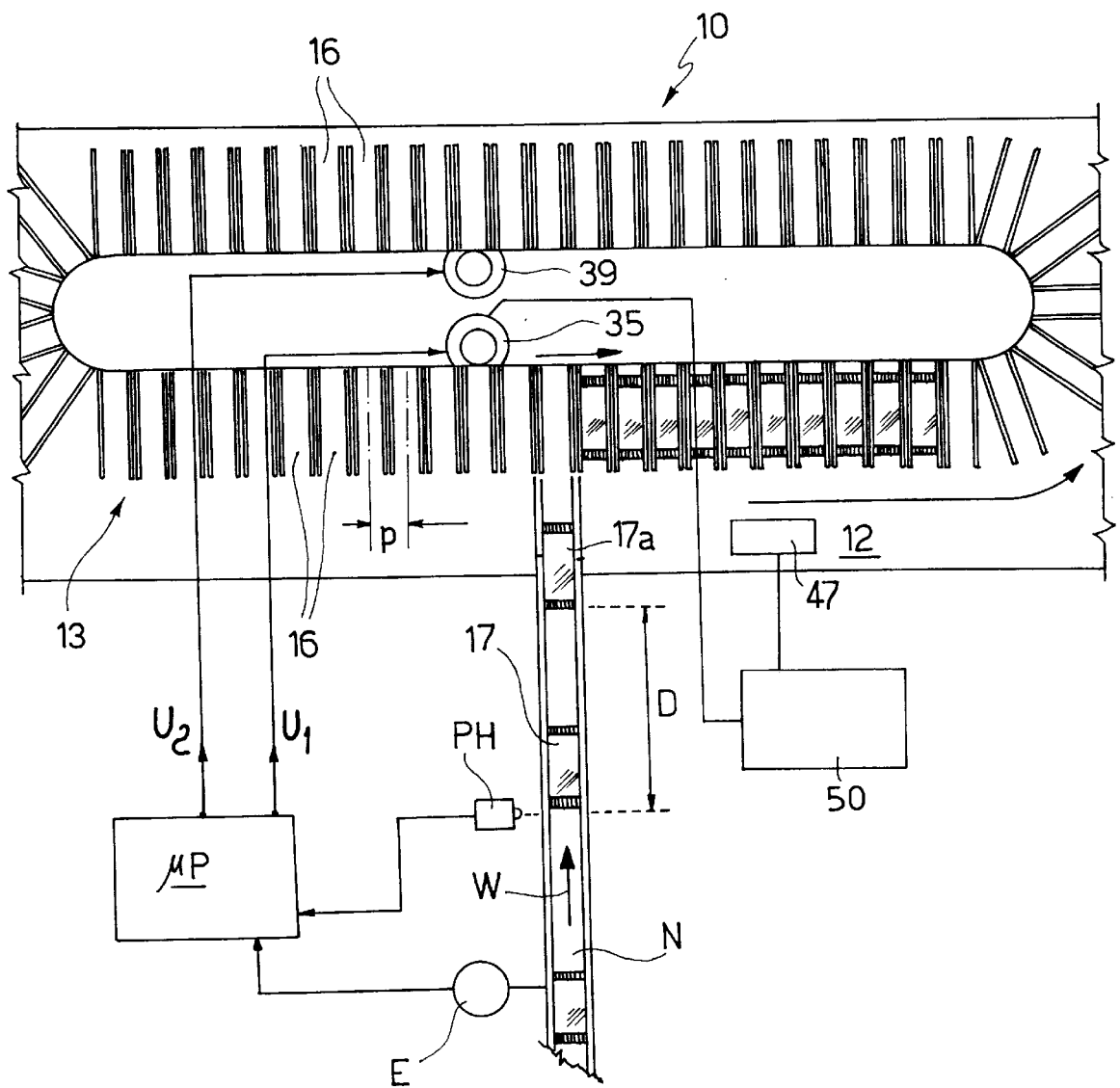
FIG. 5 is a diagram of the machine of FIG. 1 and of the corresponding electronic means provided to optimize the acceleration of the conveyor compartments.

For this purpose (FIG. 5), a photoelectric cell PH for measuring the distance D between two consecutive products such as 17–17a, and a means for measuring the speed W of the belt N, for example an encoder E, are associated with the conveyor belt N. A microprocessor $\mu$P receives the signals of the photocell PH and of the encoder E and calculates the rate T, i.e. the time that elapses between the passage of two consecutive products, where T=D/W.

The same microprocessor $\mu$P calculates the optimum acceleration $A_{ott}$ and the corresponding rule of motion of the conveyor 13, and accordingly drives, by means of respective outputs U1–U2, the motors 35–39 that actuate the conveyor portions.

For this purpose:

S=space covered by the conveyor 13 in performing a step p $V_{max}$=maximum speed of the conveyor 13

V=speed reached by the conveyor 13 during the movement through one step

A=acceleration of the conveyor 13

T=rate of arrival of the products 17.

First of all, the computer calculates the minimum time below which movement of the conveyor 13 cannot occur, where $$T_{min}=4S/A_{max} \text{ if } A_{max} \cdot T_{min}/2 < V_{max}$$

Figure 6:
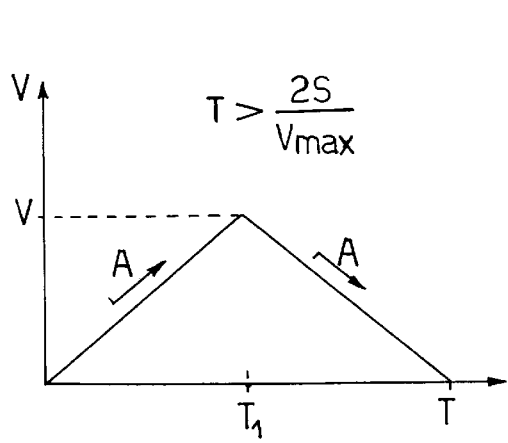
FIG. 6 is a diagram of a rule that governs the motion of the conveyor compartments.
Figure 6A:
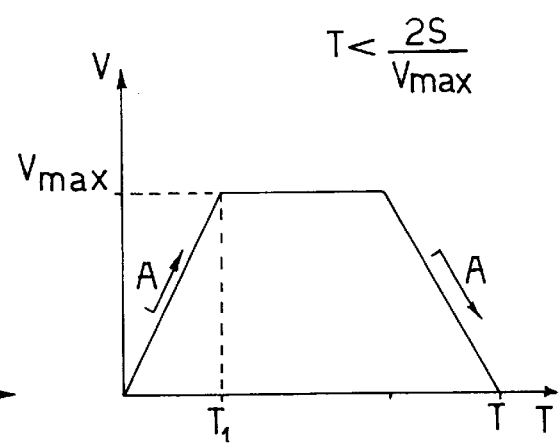
FIG. 6a is a diagram of a variation of the rule that governs the motion of the conveyor compartments.

In other cases, instead, $$T > T_{min} = V_{max}/A_{max} + S/V_{max}$$

and the computer chooses the rule of triangular motion of FIG. 6 if $$T > 2S/V_{max}$$

or the rule of trapezoidal motion of FIG. 6a if $$T < 2S/V_{max}$$

In the first case, the optimized value of the acceleration is:

$$A_{ott}=4S/T^2$$

where $T_1=T/2$ is the acceleration time.

In the second case, $$A_{ott}=V^2_{max}/(T \cdot V_{max}-S)$$

where $T_1=T-S/V_{max}$ is the acceleration time.

The details of execution and the embodiments may of course be altered extensively with respect to what is described and illustrated by way of non-limitative example without altering the concept of the invention and without thereby abandoning the scope of the invention defined by the appended claims.

What is claimed is:

1. A machine for grouping individually conveyed products, particularly food products, confectionery products, to package them, which comprises a first conveyor (13) provided with compartments (16) for accommodating said products (17) and closed in a loop to receive on a first portion (13a) of the first conveyor the products (17) arriving from a second conveyor (18), to temporarily store a group (G) of said products, and to transfer them onto a second portion (13b) of the first conveyor to a means (20) for picking up groups of products, and wherein the first conveyor is guided by driving sprockets (14–15) supported by a supporting slider (27) that is slideably mounted on a guide (28) to advance or retract according to the movement of one of the first and second portions or the other (13a–13b) of the first conveyor (13); the machine further comprises a speed reduction unit (40) arranged at the first portion (13a) of the first conveyor, directed towards the first conveyor, and provided with spaces (42) for receiving each product (17); and wherein the speed reduction unit (40) moves at the same speed as the first conveyor (13) and follows it over an extent of convenient length in order to receive the incoming products (17) and transfer them, while slowing them, into a respective compartment (16) of the first conveyor (13), while said first conveyor moves in the loading direction.

2. The machine according to claim 1, wherein the speed reduction unit (40) is constituted by a track (41) provided with spaces (42) for receiving the products that are delimited by partitions (43) and are mutually spaced by a pitch that is equal to the spacing pitch of the compartments (16) of the first conveyor (13), and in that said track is stretched by three toothed guiding sprockets (44–45–46), one of which is a driving sprocket and is actuated by a motor (47).

3. The machine according to claim 2, wherein a lower portion of the track (41) comprised between two of said guiding sprockets (44–45) runs parallel and adjacent to the corresponding first portion (13a) of the first conveyor (13) over an extent of convenient length and follows said first conveyor portion, moving at the same speed; the spaces (42) of the track (41) acting temporarily as elements for providing an ideal extension of each compartment (16) to receive the products (17) laterally out of the second conveyor (18), slow them by sliding them on the working surface (12) of the machine (10), and reduce their speed when entering the respective compartment (16) of the first conveyor (13).

4. The machine according to claims 1, 2 or 3, wherein the compartments (16) of the first conveyor (13) slide on respective oppositely arranged loading (12a) and pick-up surfaces (12b) that are delimited on the working surface (12) of the machine and are arranged below the compartments (16) of the first and, respectively, second portions of the first conveyor (13).

5. The machine according to claims 1,2 or 3, wherein it comprises a first motor and a second motor (35–39) arranged mutually opposite and selectively moving said first and second portions (13a–13b) of the first conveyor (13) by means of a driving toothed belt (26) lying below the first conveyor (13) and guided by corresponding sprockets (24–25) that are coaxial and rigidly coupled to the respective driving sprockets (14–15) of the first conveyor (13).

6. The machine according to claim 5, wherein said two motors are provided with respective toothed rollers (34–38) which, with the interposition of guiding elements (32–33–36–37), engage the respective portions (26a–26b) of the driving toothed belt (26) at their median region; and in that the first motor (35) is provided in order to produce stepwise advancements of the corresponding first portion (13a) of the first conveyor (13) and the second motor (39) is provided in order to produce multiple-step advancements of the corresponding second portion (13b) of the first conveyor (13).

7. The machine according to claim 6, wherein the movement of the two portions (13a–13b) of the first conveyor (13) is selective, in that when the first portion moving, the second one is at standstill, and vice versa.

8. The machine according to claim 5, wherein the motor (47) that actuates the track (41) of the speed reduction unit (40) is synchronized by electric shaft coupling with the first motor (35) of the two motors driving the first conveyor (13).

9. The machine for grouping individually conveyed products, particularly food products, confectionery products, to package them, comprising a first conveyor (13) provided with compartments (16) for accommodating said products and closed in a loop around respective end sprockets (14–15) to receive on a first portion (13a) the products from a second conveyor (18), to temporarily store a group (G) of said products, and to transfer them onto a second portion (13b) to a means (20) for picking up groups of products, wherein the compartmented conveyor (13) is constituted by a toothed belt (22) made of reinforced polymeric material and having, on its outer side, a plurality of uniformly spaced tabs (23) for the detachable engagement and retention of the corresponding plurality of compartments (16).

10. The machine according to claim 9, wherein said tabs have a T-shaped cross-section to slidingly engage corresponding recessed seats (16b) formed on the base (16a) of each compartment (16).

11. The machine according to claim 9, wherein it is provided with electronic means (PH, E) for detecting the feeding rate (T) of the individual products (17) and with a microprocessor ($\mu$P) that is operatively connected to the motors (35–39) for moving the compartmented conveyor (13) in order to optimize the acceleration and deceleration of the compartments (16) of said first conveyor, in performing each step (p), by correlating them to said rate.

12. The machine according to claim 11, wherein the motors (35–39) for moving the portions of the compartmented conveyor (13) are driven by said microprocessor ($\mu$P) according to a rule of triangular motion, wherein:

$$A_{ott}=4S/T^2, \text{ if } T>2S/V_{max};$$

and according to a rule of trapezoidal motion, wherein:

$$A_{ott}=V^2_{max}/(T.V_{max}-S), \text{ if } T<2S/V_{max},$$

where $A^{ott}$ is the optimum value of the acceleration of the compartments (16) in performing a single stepwise movement; S is the space covered by each compartment (16) in performing a single stepwise movement; T is the feeding rate of the products (17); and $V_{max}$ is the maximum speed of the compartmented conveyor (13).

* * * * *